April 17, 1951
W. I. WEAVER
2,549,732
PRODUCTION OF POLYMERIZED POLYESTER RESIN
MATERIALS OF SUPERIOR WATER RESISTANCE
AND ELECTRICAL PROPERTIES
Filed April 15, 1950
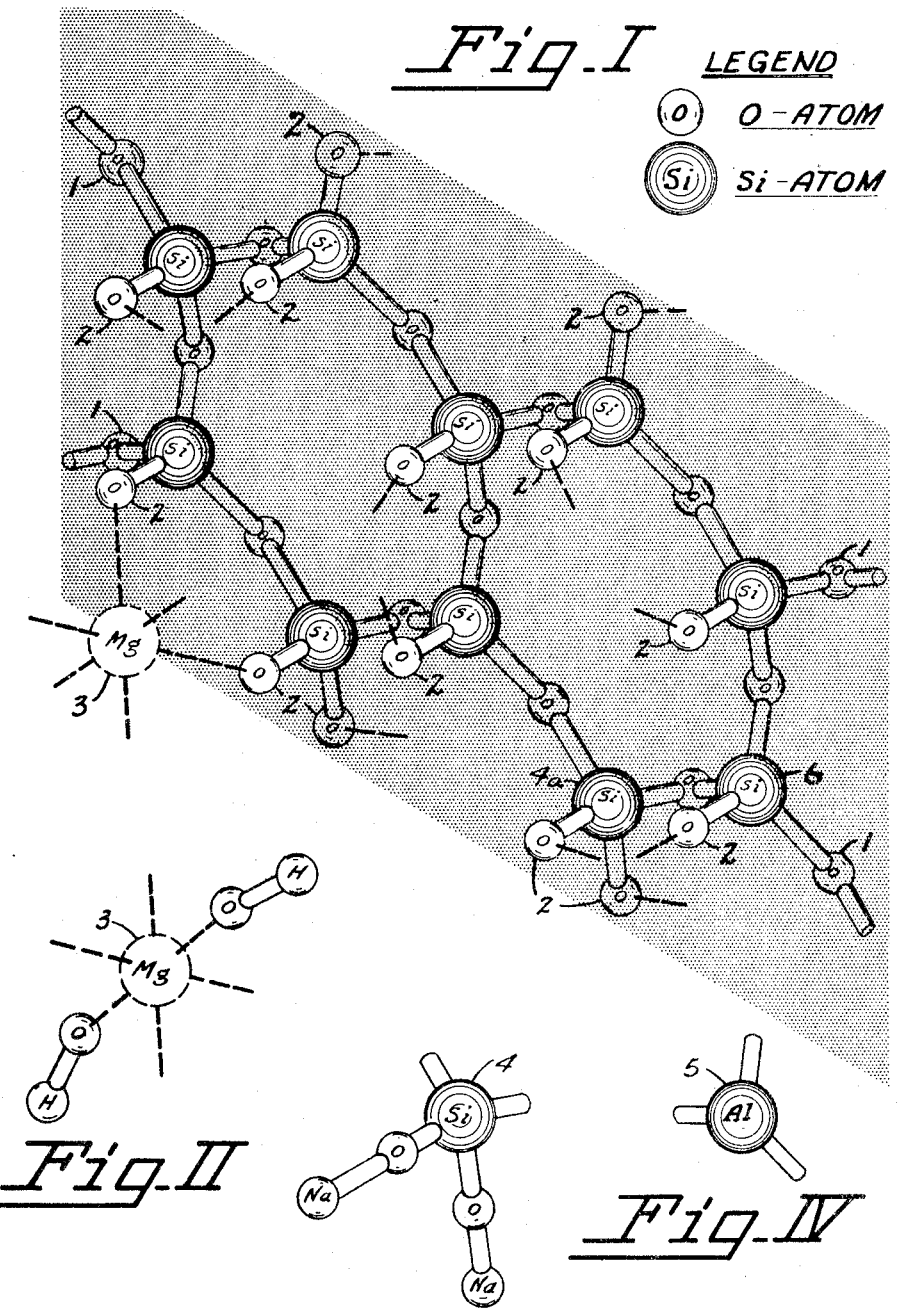
INVENTOR.
Welcome I. Weaver
BY
Marshall, Marshall & Leonard
ATTORNEYS Patented Apr. 17, 1951

2,549,732

UNITED STATES PATENT OFFICE 2,549,732

PRODUCTION OF POLYMERIZED POLYESTER RESIN MATERIALS OF SUPERIOR WATER RESISTANCE AND ELECTRICAL PROPERTIES

Welcome I. Weaver, Huntington, Ind., assignor to Libbey-Owens-Ford Glass Company, Toledo, Ohio, a corporation of Ohio Application April 15, 1950, Serial No. 156,152

24 Claims. (Cl. 260—40)

The invention relates to the production of materials of improved water resistance and electrical properties comprising a mineral fiber and a polymerized unsaturated polyester.

A polymerizable unsaturated polyester (i. e., a polymerizable unsaturated polyhydric alcohol-polycarboxylic acid polyester) is highly advantageous as a starting material for the production of hardened synthetic resins in that it is resinous in character before polymerization, and is fusible at a temperature at which polymerization is not rapid. Other heat-hardenable compositions, such as urea-formaldehyde and phenol-formaldehyde compositions, are much more difficult to fabricate because they do not exist as plastic resins at temperatures much below their hardening temperatures. Since a heat-hardenable composition can be shaped only while it is in a fused condition, the failure of other hardenable compositions to reach a fused state below their hardening temperatures is a great handicap in fabricating operations. By the time a hardenable urea-formaldehyde or phenol-formaldehyde product has reached a fused state in a fabricating operation, its hardening has already begun, so that the hardening interferes with the shaping or molding of the composition.

Still other heat-hardenable compositions, such as diallyl esters, have low melting points or are liquids at room temperature, but have the disadvantage that they do not attain a resinous state until after hardening has begun. Such compositions cannot be handled satisfactorily in the resinous state that they attain after hardening has begun because the hardening, once it has started, is very difficult to stop. Because of the difficulty of controlling the hardening of compositions such as diallyl esters once the hardening has reached the stage at which the compositions are resinous, such compositions ordinarily are shaped only by the casting method, which is the sole method by which they can be handled in non-resinous liquid form.

A polymerizable polyester is resinous ordinarily. The resinous state of such a polyester makes it possible to employ the polyester in a molding operation either alone or in admixture with a filler. A non-resinous liquid composition, such as a diallyl ester, cannot be used in a molding operation because it would be squeezed out of the filler and squirted out of the mold.

A saturated heat-hardenable polyester, such as glycerol phthalate, is hardened by esterification with elimination of water. A polyester that hardens by esterification cannot be employed to make a molded article or other solid body because it is too difficult to remove water from the interior of such a solid body in order to complete the hardening. Even urea-formaldehyde and phenol-formaldehyde products tend to give off small amounts of volatiles as they are hardened in a mold. A polymerizable unsaturated polyester hardens by polymerization without evolution of volatiles.

Among the most useful articles produced from synthetic resins are those in which a fibrous material is present, usually in the form of a filler or in the form of laminated sheets. Although a fibrous material in a hardened synthetic resin may cause a substantial improvement in strength, the presence of such fibrous material may also impart to the resin certain undesirable properties, such as poor electrical properties and poor water resistance, i. e., high water absorption. For example, cellulose fibers are known to be useful as fillers in certain synthetic resins and to impart great strength to such resins because the resins adhere well to such fibers, but the natural attraction for moisture possessed by cellulose fibers limits the possibility of obtaining good water resistance and electrical properties in synthetic resins containing such fibers. On the other hand, mineral fibers, i. e., fibers derived from a mineral source, do not possess a natural attraction for moisture as great as that of cellulose fibers. The present invention relates to the production of a novel composition containing mineral fibers of a specific type and a polymerizable unsaturated polyester and to the production of articles by the polymerization of such a composition.

There are numerous types of mineral fibers, each of which may behave differently when incorporated with different synthetic resins. For example, glass fibers have little natural attraction for moisture, but the use of such fibers in synthetic resins is limited because of the difficulty of obtaining good adhesion between glass fibers and most synthetic resins. Another type of mineral fibers is known commercially as "asbestos" although it is more properly called "Canadian asbestos." Strictly speaking "asbestos" is a generic term applicable to silicate minerals having a fibrous structure, but in actual practice "asbestos" has come to mean only "Canadian asbestos,"

i. e., chrysotile (as the mineral occurring naturally and as the fibers resulting from processing the mineral), which is so prevalent that other types of silicate mineral fibers have virtually no industrial recognition. For example, of all the silicate mineral fibers used in this country, about 96 per cent are chrysotile fibers imported from Canada, and of the silicate mineral fibers obtained from domestic mines, about 97 per cent are chrysotile fibers.

"Canadian asbestos" has been suggested as a mineral fiber filler which may be incorporated in certain synthetic resins. However, polymerized unsaturated polyesters containing "Canadian asbestos" have certain properties, such as water resistance and electrical properties, which leave much to be desired. Moreover, the unstability of polymerizable unsaturated polyesters containing "Canadian asbestos" makes storage of such polyesters difficult or impossible without substantial conversion of the polyester to the infusible state. In fact, such "asbestos" is often referred to as an "active" filler which definitely aids in setting up the resin.

The principal object of the invention is the production of a novel material comprising a polymerized unsaturated polyester and mineral fibers of a type which imparts to the material greatly improved water resistance and electrical properties.

Another object of the invention is to provide a novel material comprising mineral fibers and a polymerizable unsaturated polyester, which has greatly improved storage properties. More specific objects and advantages are apparent from the description, in which reference is had to the accompanying drawings.

Figure I is a partial view in perspective of a crystal model illustrating the basic silicon-oxygen atomic arrangement believed to exist in the crystalline structure of a mineral preferred for use in the invention.

Figures II, III and IV are each a view of one of the atomic positions shown in the crystal model of Figure I, illustrating a modification of the atomic arrangement with respect to the particular atomic position shown.

A material embodying the invention, which has improved storage properties and which upon polymerization has improved water resistance and electrical properties, comprises (a) a polymerizable unsaturated polyhydric alcohol-polycarboxylic acid polyester and (b) fibers of crystalline fibrous minerals consisting of anhydrous silicates of divalent metals.

Silicate minerals, both naturally occurring and synthetic, may have amorphous or crystalline structures. The silicate minerals of the invention have crystalline structures and are therefore distinguished from glass, for example, which has an amorphous structure. Crystalline silicate mineral fibers are obtained from relatively few mineral families, the most important of which are the serpentines and the pyroboles. The most important fibrous serpentine is chrysotile, $$3MgO.2SiO_2.2H_2O$$

a hydrous silicate of magnesium, generally referred to simply as "asbestos" because of its industrial prevalence hereinbefore mentioned. The fibrous silicates of the invention are anhydrous and are therefore distinguished from the serpentines, such as chrysotile, which are hydrous silicates. A mineral sometimes classified as a fibrous pyrobole is crocidolite, $Na_2O.Fe_2O_3.2FeO.6SiO_2$ (with up to about one mol of $H_2O$ of hydration). The fibrous silicates of the invention are silicates of divalent metals and are, therefore, distinguished from crocidolite which consists essentially of silicates of metals other than divalent metals.

The rare occurrence of the fibrous silicates of the invention and the generally inferior physical properties usually attributed to the fibers obtained therefrom have led domestic industry in general to disregard the use of such fibers for commercial purposes. Such fibers are usually so much weaker, harsher and more brittle than chrysotile fibers that they have been considered unsatisfactory for use as fibers in textiles, as well as for use as fibrous fillers to strengthen synthetic resins Heretofore, aside from limited use in laboratory filters (in the case of the acid-resistant members) and special insulation materials, such fibers have remained a mineralogical curiosity.

The present invention relates to the use of a certain type of silicate fibers; and it is based on the discovery that such fibers, despite their apparent weakness, may be employed in polymerized unsaturated polyesters not only to impart strength substantially equal to that imparted by mineral fibers such as chrysotile fibers, but also to bring about certain pronounced improvements in the properties of such polyesters as compared to those of polyesters containing other mineral fibers Also, it has been discovered that the incorporation of such fibers in a polymerizable unsaturated polyester does not affect deleteriously such properties as the storage stability. In short, by the use of the silicate fibers of the invention a marked improvement is obtained in the storage properties of the polymerizable unsaturated polyesters, as well as in their water resistance and electrical properties.

Although the silicate fibers used in the practice of the invention may be fibers of any one or more of the crystalline fibrous minerals consisting of anhydrous silicates of divalent metals, practically the only members of this group which are available for industrial purposes are members of the pyrobole family. The pyroboles that are used in the practice of the invention are minerals consisting essentially of silicates of divalent metals having the general chemical composition:

$$MO.SiO_2$$

wherein M is a divalent metal; but they may also contain small amounts of monovalent metals (e. g., sodium or potassium) and trivalent metals (e. g., ferric iron and aluminum). Examples of the fibrous silicates that may be used in the practice of the invention include:

Diopside, $(Ca,Mg)O.SiO_2$, essentially a silicate of calcium and magnesium;
Wollastonite, $CaO.SiO_2$, a relatively pure silicate of calcium;
Anthophyllite, $(Mg,Fe)O.SiO_2$, essentially a silicate of iron and magnesium, usually with a little aluminum;
Tremolite, $3MgO.CaO.4SiO_2$, a relatively pure silicate of magnesium and calcium;
Actinolite, $3(Mg,Fe)O.CaO.4SiO_2$, similar to tremolite, but containing at least 3 per cent by weight of FeO; and
Others descriptively named mountain leather and mountain cork.

The pyroboles are further classified in two distinct classes or families, viz. amphiboles and pyroxenes. According to J. W. Mellor in "Inorganic and Theoretical Chemistry" (Longmans, Green and Co., 1925), volume VI, pages 390 and 391, diopside and wollastonite are pyroxenes; and anthophyllite, tremolite and actinolite are amphiboles. The amphiboles have a different angle of cleavage (and are thereby distinguished) from the pyroxenes, which have substantially the same chemical composition as the amphiboles. Although the amphiboles and pyroxenes have certain differences, they also have certain fundamental similarities, such as the ability to undergo isomorphism, which is a characteristic of the fibrous silicates used in the practice of the invention. In general, the crystalline structure of such silicates is understood to comprise a number of substantially parallel silicon-oxygen chains having therebetween metallic ions which form cross-links between the chains through co-ordinate linkages with oxygen atoms in the chains, as represented by the following structure:

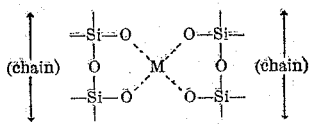

wherein M is a metallic ion having at least four co-ordinate valences (the co-ordinate bonds being represented by broken lines and the ordinary bonds by solid lines). Although the silicon-oxygen atomic arrangement in the chains of each of such silicates is analogous to the atomic arrangement of high polymer resins, in that it involves a number of repeating units, the specific arrangement of each silicate is different. The accompanying drawings illustrate in part the specific atomic arrangement in the molecular chains of the preferred fibrous silicates of the invention, the amphiboles, and various modifications thereof resulting from isomorphous substitution.

Referring to the drawings in detail, Figure I is a partial view in perspective of a crystal model illustrating the silicon-oxygen atomic arrangement believed to exist in an amphibole chain. It can be seen from Figure I that an amphibole chain comprises a series of condensed rings having alternating silicon and oxygen atoms therein. Certain "intracyclic" oxygen (O) atoms 1 reach out at both ends of the portion of the chain illustrated in Figure I to form other rings (not shown), and certain "exocyclic" oxygen atoms 2 reach out to form co-ordinate bonds for the purpose of cross-linking the chain with other chains (not shown) through metallic ions, one of which might occupy the position 3 shown in dotted lines in Figure I. An example of a metallic ion which might occupy the position 3 shown in Figure I is the magnesium ion, which is capable of forming six co-ordinate bonds (as shown in Figure I). Other metallic ions which might occupy positions similar to the position 3 shown in Figure I include calcium, manganese, aluminum, ferrous and ferric ions.

In its fundamental aspects isomorphism relates to the ability of certain ions to replace other ions in a crystal structure without causing any essential alteration in the crystal structure. Thus in the case of tremolite, for example, which is a relatively pure silicate of magnesium and calcium, the crystal structure is understood to comprise magnesium and calcium ions, in an orderly arrangement, cross-linking the various chains of the amphibole through co-ordinate linkages. However, if another metal such as iron was present during the formation of tremolite crystals, certain of the positions which would normally be occupied by magnesium or calcium ions in the crystal may be occupied by ferrous or ferric ions. The phenomenon of isomorphism permits such substitution of a ferrous or ferric ion for a magnesium or calcium ion without causing any essential alteration in the crystal structure. The amount of iron so incorporated in the crystal structure may be quite substantial, or it may be so very slight that it appears merely as an impurity, depending upon the particular circumstances involved. In most instances, ferrous, manganese and magnesium ions are completely interchangeable; calcium ions may be replaced entirely by ferrous or magnesium ions; but aluminum and ferric ions may replace magnesium ions only to a limited extent. The chain structure of the pyroxenes is different from that of the amphiboles, but the isomorphic properties of the pyroxenes are about the same as the amphiboles.

Certain other ionic structures may occur in the crystalline fibrous silicates of the invention, either as a part of the "standard" or most commonly known composition of the mineral or as a result of isomorphous substitution more radical in character than the mere substitution of one polyvalent metallic ion for another. The fundamental features of such structures are illustrated in Figures II, III and IV.

Figure II illustrates a modification of the ionic structure involving the position 3 of the metallic ion of Figure I. In Figure II, two of the co-ordinate valences of the metallic ion are satisfied by —OH groups. It is understood that combined water may thus be present in slight amounts in the crystalline structure. As hereinbefore mentioned the fibrous silicates of the invention are anhydrous silicates; but it is, of course, a practical impossibility to obtain an absolutely anhydrous silicate mineral. A small amount of combined water, for example, not more than about 0.2 mol per mol of $SiO_2$, is often present in the fibrous silicates of the invention. The fundamental or "standard" compositions of the pyroxenes do not indicate the presence of any combined water; but the most recently published "standard" compositions of the amphiboles indicate that a very small amount of combined water is present as a part of the basic crystal structure. In any event, the minute amount of combined water present may vary because of limited isomorphism; and the present fibrous silicates are anhydrous as contrasted to chrysotile

$(3MgO.2SiO_2.2H_2O)$ for example, in that the present fibrous silicates do not contain more than about 0.2 mol of $H_2O$ per mol of $SiO_2$. Fibrous silicates containing combined $H_2O$ in amounts above the foregoing maximum do not give the superior results obtained in the practice of the present invention.

Figure III illustrates a modification of the atomic structure surrounding a silicon atom 4 which might occupy a position such as that occupied by a silicon atom 4a of Figure I having two exocyclic oxygen atoms bonded thereto. In Figure III, one of the valences of each of the exocyclic oxygen atoms is satisfied by a sodium ion. It is understood that monovalent metallic ions such as sodium or potassium may thus be present in the crystalline structure. As hereinbefore mentioned the fibrous silicates of the invention are silicates of divalent metals; but they may contain small amounts of monovalent metals (e. g., sodium and potassium). It is, of course, well known that minerals are almost never chemically pure substances having an exact chemical formula. This is particularly true because of the phenomenon of isomorphism, since mineralogical classification is based upon crystalline structure, and isomorphism permits changes in the chemical composition which do not affect appreciably the crystalline structure. On the other hand, it is to be appreciated that the amount of sodium or potassium which may be present in the instant crystalline structure is relatively small since sodium or potassium is not understood to form cross-links between the chains. The presence of substantial amounts of sodium in the fibrous silicates appears to give a harmful effect, whatever may be the actual disturbance in the crystalline structure caused by the presence of sodium. The crystalline fibrous silicates of divalent metals used in the practice of the invention are, therefore, a mineralogical class of compounds which do not contain an appreciable amount of monovalent metals. e. g., which do not contain more than about 0.1 mol of $Na_2O$ per mol of $SiO_2$, as contracted to crocidolite ($Na_2O.Fe_2O_3.2FeO.6SiO_2.XH_2O$). The fibrous silicates which contain no sodium are preferred, since the presence of sodium apparently reduces the acid resistance of the silicate fibers, and also reduces the improvement in electrical properties obtained in the practice of the invention.

Figure IV illustrates a modification of the ring structure which might be obtained by isomorphous substitution of an aluminum atom 5 for a silicon atom 6 of Fig. I which forms a part of the ring structure in an amphibole chain. In Figure IV, each of the valences of the aluminum atom 5 is understood to be satisfied by a valence of an "intracyclic" oxygen atom. Aluminum atoms may be present in the crystalline structure either as a part of the cross-link, as shown in Figures I and II, or as a part of the ring structure of the chains, as shown in Figure IV. It is apparent that the amount of aluminum which may be present in the instant crystalline structure is relatively small, since such a trivalent metal either disturbs the co-ordinate bond arrangement in a cross-link (Figure II) or disturbs the oxygen atomic arrangement in the chain by reducing the number of "exocyclic" oxygen atoms (Figure IV). In any event, the presence of substantial amounts of a trivalent metallic atom such as the aluminum ion or the ferric ion in the fibrous silicates appears to produce a harmful effect, whatever may be the actual disturbance in the crystalline structure caused by the presence of such trivalent metallic ions. The crystalline fibrous silicates of divalent metals used in the practice of the invention are, therefore, a mineralogical class of compounds which do not contain an appreciable amount of trivalent metals, e. g., which do not contain more than about 0.1 mol of $Fe_2O_3$ or $Al_2O_3$ per mol of $SiO_2$.

In most fibrous silicates isomorphism is limited; i. e., partial replacement of one type of metallic ions in a mineral does not change the mineral per se but very substantial or complete replacement of such ions results in a new mineral. On the other hand, such new mineral may or may not be a member of the same mineral family. For example, partial replacement of magnesium ions by ferrous ions in anthophyllite may not yield a mineral that is not "anthophyllite," but a very substantial replacement of the magnesium ions by ferrous and ferric ions may yield a mineral known as "amosite," sometimes referred as "iron-rich" anthophyllite. Amosite is recognized as a different mineral from anthophyllite, although it is also classified as an amphibole, and may be used in the practice of the invention if it consists of anhydrous silicates of divalent metals as hereinbefore defined. Although the crystalline structures of the other fibrous silicates of the invention are somewhat different from the amphibole structure (e. g., the pyroxene structure has a simpler chain arrangement), the fundamental principles of isomorphism apply to these crystalline structures in like manner.

Although all the silicate fibers of the invention are characterized by the ability to bring about the outstanding improvements described, such fibrous silicates naturally differ among themselves in respect to these improvements, to some extent, and also in respect to certain other valuable characteristics. For example, the amphiboles (particularly tremolite and anthophyllite) appear to possess the strongest and the most flexible fibers, and the fibers of such amphiboles are therefore preferred in the practice of the invention. Also, the amphibole fibers (particularly anthophyllite) impart the best storage stability in the practice of the invention. On the other hand, other characteristics may be controlling in the selection of silicate fibers for a specific embodiment of the invention. For example, the most pronounced improvement in water resistance is obtained in products containing anthophyllite or wollastonite fibers, and therefore such fibers are preferred for embodiments requiring maximum water resistance. At present, anthophyllite is the least expensive fibrous silicate and therefore its fibers are preferred if low cost is important. On the other hand, if color is a controlling factor, the fibers of the white pyroboles (e. g., tremolite, wollastonite, diopside, and actinolite in some instances) are preferred.

Fibrous silicates of the invention are available commercially in the form of the crude ore from the mine and in the form of fibers obtained by milling the ore (e. g., in a crusher) and then separating the fibers from the rock residue (e. g., by suction). Ordinarily, the fibers commercially available must be purified further for use in the invention, since such fibers usually contain a substantial amount of mineral impurities which affect deleteriously many of the properties of the products of the invention. The necessity and extent of purification for the purposes of the invention are determined by the nature of the impurities, their effect on the mechanical strength of molded articles and their damaging effect on the mold itself. Silicate fibers sufficiently purified for the purposes of the invention may be obtained by carrying out a simple flotation process, e. g., by introducing water continuously into the bottom of a vessel equipped with an overflow and containing the silicate fibers, so that the impurities remain at the bottom of the vessel and the purified fibers float out with the overflowing water. If extreme purity of the fibers is required in a specific embodiment of the invention, tremolite fibers are preferred, since tremolite occurs naturally in a very pure state and often requires little or no further purification.

Fibrous silicates, as contrasted to massive silicates, occur in various fiber lengths ranging up to as much as 7 inches. The fiber lengths are reduced substantially in the ordinary milling process, although in some instances the initial fibers are of a short needle-like or rod-like structure. No particular fiber length is required for use in the practice of the invention, and the selection of the desired fiber length depends upon the particular embodiment of the invention. For example, if the silicate fibers are to be used as a filler in a molding compound the fibers are ground down to the size of ordinary fibrous fillers for use in such compounds, i. e., the fiber lengths of groups No. 6 and No. 7 of the Canadian asbestos classification, at which the fibers appear to the naked eye to be similar in form to sawdust. On the other hand, if the fibers are to be woven into a fabric for use in a laminated article embodying the invention, fibers of substantial length (e. g., 3/4 inch) may be used, i. e., silicate fibers which are not too harsh and brittle for weaving purposes.

The polymerizable unsaturated polyhydric alcohol-polycarboxylic acid polyester used in the practice of the invention is prepared by reaction of one or more polyhydric alcohols and one or more polybasic acids. The proportion of polyhydric alcohols having more than two hydroxy groups, such as glycerol or pentaerythritol, and the proportion of polycarboxylic acids having more than two carboxy groups, such as citric acid, preferably is small so that in the production of the polyester there may be maximum esterification of the hydroxy and carboxy groups without attainment of excessive viscosity. Ordinarily it is desirable that the unsaturated polyester be polymerizable into an infusible or high melting point resin, so that the proportion of unsaturated components should be such that the polyester contains an average of more than one double bond per molecule; for example, there may be an average of eleven or more double bonds in every ten molecules of the polyester.

The present invention is equally applicable to all polymerizable unsaturated polyhydric alcohol-polycarboxylic acid polyesters. A typical example of such a polyester is a product prepared by the reaction of an unsaturated dicarboxylic acid such as maleic, fumaric, itaconic, citraconic or mesaconic acid with a dihydric alcohol such as any polymethylene glycol in the series from ethylene glycol to decylene glycols (e. g., decamethylene glycol), propylene glycol, any butylene glycol, any polyethylene glycol in the series from diethylene glycol to nonaethylene glycol, dipropylene glycol, any glycerol monobasic acid monoester (in either the alpha or beta position), such as monoformin or monoacetin, any monoether of glycerol with a monohydric alcohol, such as monomethylin or monoethylin, or any dihydroxy alkane in which the hydroxy radicals are attached to carbon atoms that are primary or secondary or both, in the series from dihydroxy butane to dihydroxy decane.

Part of the unsaturated dicarboxylic acid may be replaced by a saturated dicarboxylic acid, such as any normal acid in the series from oxalic acid and malonic acid to sebacic acid, or any benzene dicarboxylic, naphthalene dicarboxylic or cyclohexane dicarboxylic acid, or diglycolic, dilactic or resorcinol diacetic acid. All of the unsaturated acid may be replaced by a saturated acid if a polyhydric alcohol is present whose molecule has two or three free hydroxy groups and consists of an ether of one or two molecules of allyl or methallyl alcohol with one molecule of a polyhydroxy compound such as glycerol, pentaglycerol, pentaerythritol, butantetrol-1,2,-3,4, a trihydroxy normal alkane having from four to five carbon atoms such as butantriol-1,2,3 or a mono-alkyl ether of pentaerythritol or butantetrol-1,2,3,4 in which the alkyl radical has from one to four carbon atoms and has from one to two hydrogen atoms attached to the same carbon atom as the other linkage, such as the monomethyl or monoisobutyl ether of pentaerythritol.

In the preparation of the polymerizable unsaturated polyester, any of the usual modifiers such as monobasic acids, monohydric alcohols and natural resin acids may be added. The larger the proportions of monobasic acids and monohydric alcohols, the lower is the average number of acid and alcohol residues in the resulting polyester molecules, and the lower is the viscosity of the polyester. On the other hand, the more nearly equal the molecular proportions of dibasic acid and dihydric alcohol, the greater is the average number of residues in the resulting polyester molecules, and the greater is the viscosity. The proportions of ingredients used are those proportions that produce a polymerizable polyester of the desired viscosity. Other properties of the polyester, such as solubility in various solvents, also may be varied by selecting various reacting ingredients and varying their proportions. The infusibility, hardness and inertness of the product obtained by polymerization of the polyester may be increased by varying the initial reacting ingredients to increase the average number of double bonds per molecule of the polymerizable polyester.

The point to which the reaction of the ingredients is carried in the preparation of the polymerizable polyester is simply that point at which the product has the desired consistency. The consistency or viscosity of the polyester varies directly with the average number of acid and alcohol residues in the molecule. For example, the average number of residues in the molecule of the polyester may vary from about three to about one hundred twenty.

If desired, the reaction may be expedited by use of an acid substance as a catalyst. Any organic acid, inorganic acid or acid salt that is soluble in the reaction mixture may be employed as a catalyst, but it is desirable that any acid substance used be readily volatile or be of such a character that it has no deleterious effect in the final product. The amount of acid catalyst employed is simply that amount which accelerates the esterification to the desired degree.

The reaction is carried out at a temperature high enough and for a time long enough to secure the desired consistency. An elevated temperature preferably is employed to expedite the reaction, but during the preparation of the polyester, the temperature should not be so high nor the time of the reaction so long as to cause substantial polymerization. There is less danger of premature polymerization if an inhibiting agent is added before the esterification is carried out.

Whenever added, an inhibiting agent is used in the proportion required to give the desired degree of inhibiting effect. It may be necessary to use different inhibitors in widely different proportions in order to secure the same inhibiting effect.

Any desired anti-oxidant such as hydroquinone, pyrogallol, tannic acid or any aromatic amine, such as aniline or phenylene diamine may be employed as an inhibitor.

The preparation of the unsaturated polyester preferably is carried out in an atmosphere of an inert gas such as carbon dioxide, nitrogen or the like, in order to prevent darkening or to make it possible to obtain a pale or colorless product. Bubbling the inert gas through the reacting ingredients is advantageous in that the gas serves the added functions of agitation and of expediting the removal of water formed by the reaction. Exclusion of oxygen is desirable not only because it causes discoloration, but also because it tends to produce premature polymerization at the elevated temperatures used.

The acid number of the product depends upon the degree of reaction and the proportions of acid and alcohol used for the reaction. With equimolecular proportions of dibasic acid and dihydric alcohol, the reaction may be carried to an acid number of about 20. The use of an acid catalyst may make it possible to attain a lower acid number without substantial polymerization.

A polymerizable polyester may be prepared by the following procedure:

A three-necked flask is employed in which 5.4 mols of maleic anhydride and 5.4 mols of diethylene glycol are mixed together. The flask is then fitted with a thermometer, a tube leading to a condenser and an inlet tube through which is introduced a moderate stream of carbon dioxide, and is lowered into an oil bath at a temperature of 210° C. During the subsequent reaction the distillate may be analyzed, and a sufficient amount of the ingredient lost in excess may be added to the flask from time to time to maintain the initial proportions of reacting ingredients. If the only addition is a sufficient amount of the ingredient lost in excess to maintain the initial proportions, the rate of removal of unreacted ingredients gradually decreases and substantially no unreacted ingredients may be left in the composition at the end of the reaction. After 8 hours at such temperature, a polyester is obtained in the form of a stiff liquid having an acid number of 18. If ethylene glycol were substituted for the diethylene glycol in the foregoing procedure, it would be difficult to reduce the acid number below 40 without causing polymerization, and the product would be a very thick gum.

Alternatively, this first procedure, as described in the foregoing paragraph, may be employed except that 1.5 instead of 5.4 mols of maleic anhydride and 1.5 instead of 5.4 mols of diethylene glycol are used together with an amount of hydroquinone equal to 0.2 per cent of the reacting ingredients; and reaction is continued for 6¼ hours. (The terms "per cent" and "parts," as used herein to refer to quantities of material, mean per cent and parts by weight, unless otherwise qualified.) The resulting polyester is a moderately stiff liquid having an acid number of 11.

A further procedure that may be used is the same as the first procedure except that 2 instead of 5.4 mols of maleic anhydride and 2.1 instead of 5.4 mols of diethylene glycol are used; and the reaction is carried out for 4½ hours to produce a stiff liquid having an acid number of 14.

Another type of polymerizable polyester may be prepared by a procedure that is the same as the first procedure except that 3 instead of 5.4 mols of maleic anhydride and 3.3 instead of 5.4 mols of diethylene glycol are used together with an amount of hydroquinone equal to .09 per cent of the reacting ingredients and an amount of p-toluene sulfonic acid equal to 0.18 per cent of the reacting ingredients; and the reaction is carried out for four hours at 200° C. to produce a stiff liquid having an acid number of 10.6.

As a further alternative, the first procedure may be employed except that the amount of maleic anhydride employed is 6 instead of 5.4 mols; the diethylene glycol is replaced by 6 mols of ethylene glycol; a slower stream of carbon dioxide is used; and the ingredients are kept in an oil bath at 220° C. for 5½ hours. The resulting polyester is a very thick gum having an acid number of 53.

A polymerizable polyester may also be prepared by a procedure that is the same as in the preceding paragraph except that the maleic anhydride is replaced by 5 mols of fumaric acid; the ethylene glycol is replaced by 5 mols of diethylene glycol; and the reaction is continued for 8¼ hours. The resulting polyester is a stiff liquid having an acid number of 23. If in the foregoing procedure the diethylene glycol were replaced by an equimolecular proportion of ethylene glycol and half of the fumaric acid were replaced by an equimolecular proportion of phthalic anhydride, the product would be a hard brittle solid. The substitution of fumaric acid for maleic anhydride increases the length of time required to reach a given acid number at a given temperature. However, the accelerating effect of an acid catalyst upon the esterification is greater when fumaric acid is used. When fumaric acid is employed, other conditions being the same, the resulting polyester tends to be more viscous and greater care is necessary in order to prevent premature polymerization.

As a further variation, the first procedure may be used except that the maleic anhydride is replaced by 1.5 mols of fumaric acid; the amount of diethylene glycol employed is 1.5 instead of 5.4 mols; and the temperature is varied between 200 and 220° C. After the reaction has been continued for 2½ hours, the acid number is 73. After 6 hours, the product is a stiff liquid having an acid number of 41.

A polymerizable polyester may also be prepared by a procedure that is the same as that of the preceding paragraph except that p-toluene sulfonic acid (1.5 grams) is added to the initial ingredients; and reaction for only 2½ hours instead of 6 hours is required to produce a stiff liquid having an acid number of 41.

A procedure that may also be used is the same as that of the next to the last paragraph except that the fumaric acid is replaced by 3.3 mols of maleic anhydride; the amount of diethylene glycol used is 3.0 instead of 1.5 mols; 1.5 grams of p-toluene sulfonic acid and 1.3 grams of hydroquinone are added to the initial ingredients; and the reaction is carried out for 3 hours to produce a limpid liquid having an acid number of 26.

A polymerizable polyester may be prepared by a procedure that is the same as the next to the last paragraph except that 3 instead of 1.5 mols of fumaric acid and 3.3 instead of 1.5 mols of diethylene glycol are used; and the reaction is carried out for 3 hours at temperatures ranging from 200–210° C. to produce a stiff liquid having an acid number of 12.

A further procedure that may be used is the same as that of the next to the last paragraph except that the hydroquinone is omitted; and reaction for 5 hours is required to produce a stiff liquid having an acid number of 28.

Another procedure that may be used is the same as the procedure of the next to the last paragraph except that the weight of p-toluene sulfonic acid is equal to 0.18 per cent of the reacting ingredients; an amount of hydroquinone equal to 0.09 per cent of the reacting ingredients is added at the start of the reaction; and reaction is carried out at 200° C. for 5 hours to produce a stiff liquid which has an acid number of 10.1.

Polymerization of these materials usually is carried out at temperatures of about 160° to about 180° F. A solution comprising one or more polymerizable unsaturated polyesters and one or more polymerizable monomeric compounds is particularly useful as a binder. Either the unsaturated polyester or the monomeric compound or both may be partially polymerized before the ingredients are mixed. Polymerizable monomeric compounds that are useful for the preparation of such a solution include diallyl phthalate, diallyl oxalate, diallyl diglycolate, triallyl citrate, carbonyl bis-(allyl lactate), maleyl bis-(allyl lactate), fumaryl bis-(allyl lactate), succinyl bis-(allyl lactate), adipyl bis-(allyl lactate), sebacyl bis-(allyl lactate), phthalyl bis-(allyl lactate), fumaryl bis-(allyl glycolate), carbonyl bis-(allyl glycolate), carbonyl bis-(allyl salicylate), tetra-(allyl glycolate) silicate, and tetra-(allyl lactate) silicate.

In the production of a molding compound embodying the invention the mixing of the silicate fibers with the polymerizable polyester may be carried out by any of the known methods. If the polyester is very viscous, it may be necessary to incorporate the silicate fibers in the polyester on a heated two-roll (differential speed) rubber mill or it may be desirable to heat the polyester in order to reduce the viscosity sufficiently to permit the use of other mixing procedures. Ordinarily the viscosity of the polyester is such that kneading or equivalent mixing procedures may be used satisfactorily. In some cases it may be desirable to dilute the polyester with a solvent in order to facilitate mixing with the silicate fibers.

The function of the polyester is that of a binder, and accordingly the proportion of the silicate fibers in a molding composition embodying the invention may range from a very small proportion such as about 5 per cent to a very high proportion such as about 75 per cent. The compositions containing very small amounts of the silicate fibers are usually special compositions in which a mixed filler of the silicate fibers of the invention and another material, such as a cellulosic material, silica or mica, is employed. It may be desirable to use a mixed filler of the silicate fibers and another material, such as silica or mica, in a cold molding composition, for example, in which the per cent total filler in the composition may be as high as about 90 per cent. Generally speaking, the preferred range is from about 60 per cent to about 70 per cent of the silicate fibers in the molding compound, and the best all-around results are obtained in the upper portion of such range.

Another aspect of the invention resides in the discovery that a material comprising a polymerized unsaturated polyester which contains, as a filler, a mixture of the silicate fibers and kaolin or China clay, has not only the improved properties hereinbefore described but also an added improvement in hardness, strength and surface finish of the polymerized material. In other words, it has been found that a filler comprising a combination of the silicate fibers and kaolin (which is non-fibrous) is capable of imparting to a polymerized unsaturated polyester all of the improvements which the silicate fibers alone impart, and in addition certain other substantial improvements. Moreover, kaolin is less expensive than any of the fibrous silicates and therefore a substantial economic advantage is obtained in the use of the foregoing combination as a filler. A preferred form of kaolin for use in the invention is a commercial product known as "Georgia clay" (i. e., "Witco Ideal" available from Witco Chemical Co.).

A polymerizable unsaturated polyester containing, as a filler therefor, a mixture of the silicate fibers and kaolin is a preferred embodiment of the invention not only because of the improvement in the properties of the product of the polymerization of such a polyester, but also because of the greatly improved flowing characteristics of the polyester during molding. Kaolin and the silicate fibers may be incorporated in the polymerizable polyester separately or they may be mixed together first and then incorporated in the polyester. In either case, any of the means hereinbefore described for incorporating the silicate fibers may be used in order to obtain a mixture of such materials in the polyester, as a filler therefor.

The proportion of the foregoing mixture in a molding composition embodying the invention is within the range hereinbefore described, and, likewise, the preferred range is from about 60 per cent to about 70 per cent of the molding compound. At least an appreciable amount of both kaolin and the silicate fibers is used in such a mixture in order to obtain the benefit of the improvements, such as reduction in brittleness, which are imparted by a fibrous filler, as well as the improvements hereinbefore mentioned which are imparted by kaolin. As a rule, the proportion of kaolin to silicate fibers in the mixture may range from the minimum proportion at which the effect of kaolin is noticeable (i. e., about 1:100) to the maximum proportion at which the effect of the silicate fibers is noticeable (i. e., about 6:1), the preferred proportions being in the upper portion of the range, for economic reasons. The optimum results are obtained at a kaolin to silicate fiber ratio ranging from about 1:1 to about 2:1. For example, in the practice of the invention a molded article which contains a filler consisting of equal amounts of kaolin and silicate fibers may have as much as 25 per cent greater compressive strength than a similar molded article which contains a filler consisting only of the silicate fibers.

The magnitude of the improvement in a single property, such as the water resistance of molded articles, that is obtained in the practice of the invention using the silicate fibers alone, and using a filler mixture of the silicate fibers and kaolin, may be demonstrated by tests carried out as follows:

A polymerizable unsaturated polyester is prepared by the procedure hereinbefore described from a charge consisting of 1.05 mols of monoethylene glycol, 1 mol of maleic anhydride and an amount of hydroquinone equal to 0.04 per cent of the charge. The charge is heated to 220° C. (over a period of two hours) and is held between 220° C. and 226° C. for six more hours. The resulting polyester (95 parts), which has an acid number of about 35, is cooled to 60–70° C. and is mixed thoroughly with diallyl phthalate (5 parts) and a paste of tricresyl phosphate (1.5 parts) and benzoyl peroxide (1.5 parts), as a catalyst, to form a solution. The filler or filler mixture, the polymerizable polyester solution and, as a lubricant, an amount of zinc stearate equal to 2 per cent of the composition are then milled for 10–12 minutes on a heated two-roll (differential speed) rubber mill at the lowest temperature at which a homogeneous mass can be obtained (not above about 75° C.). The resulting composition is removed in sheets, is allowed to solidify fully while at about 80° F.–90° F. and then is granulated in a high speed cutter to a maximum particle diameter of about ⅛ inch. The granulated composition is compression molded to produce articles of dimensions suitable for physical testing. The composition has excellent flowing properties, and is fast-curing and gives moldings free from gas.

Table 1 shows the results of water resistance tests of articles prepared as above described, and more specifically describes the compositions from which the articles are molded by specifying the per cent of the silicate (anthophyllite) fibers in the composition (line 2), the percent of chrysotile fibers in the composition (line 3) and the per cent of kaolin (Georgia clay) in the composition (line 4).

The water resistance tests employed are standard tests for plastic materials and are considered to be capable of showing generally the water resistance characteristics that are important in industrial materials of this class. Water resistance varies with the amount of moisture that an article is capable of absorbing because the degree of deterioration upon exposure to moisture varies with the amount of water absorbed.

The test piece, referred to hereinafter, for determination of water absorption, is a 6.5 gram two-inch diameter disk molded for one minute under a pressure of 17,000 pounds per square inch of projected area in a mold heated with steam at 75 pounds per square inch gauge pressure. The disk is immersed in hot or cold water for a given period of time, and the water absorption is measured as the gain in weight (in grams) during immersion. In Table 1, the water absorption (in grams) is given for tests in which test pieces made from the various molding compositions are immersed in hot (boiling) water for one hour (line 5), in cold water for one day (line 6), two days (line 7) or seven days (line 8.)

*Table 1*

| 1 | Run | 1A | 1B | 1C | 1D | 1E |
|---|---|---|---|---|---|---|
| 2 | Per cent Silicate fibers | | | | 25 | 70 |
| 3 | Per cent Chrysotile fibers | 60 | 23 | | | |
| 4 | Per cent Kaolin | | 40 | 65 | 40 | |
| 5 | Hot Water Absorption (1 hour) | 0.190 | 0.150 | 0.090 | | 0.080 |
| 6 | Cold Water Absorption (1 day) | 0.100 | 0.070 | 0.055 | 0.040 | 0.025 |
| 7 | Cold Water Absorption (2 days) | 0.155 | 0.130 | 0.090 | 0.055 | 0.045 |
| 8 | Cold Water Absorption (7 days) | 0.380 | 0.305 | 0.170 | 0.130 | 0.105 |

From Table 1 it can be seen that the water absorption of polyesters containing only chrysotile fibers (column 1) is four times as great as that of the polyesters containing only the silicate fibers of the invention (column 5) in the one-day cold water absorption test, and over twice as great in the one-hour hot water absorption test. Also, a peculiar feature of the combination of kaolin and the silicate fibers, as a filler mixture, is shown by the fact that as much as two-thirds of the silicate fibers may be replaced by kaolin in the polyester (column 4) without causing a very substantial increase in the water absorption of the polyester particularly in the two- and seven-day cold water absorption tests. Moreover, the polymerized polyester containing the filler combination of kaolin and the silicate fibers is substantially improved in other physical properties, particularly in surface finish, strength and hardness. For example, articles containing a filler mixture of the silicate fibers and kaolin (run 1D) have a Barcol hardness of 62, whereas articles containing the silicate fibers alone (run 1E) have a Barcol hardness of 59.

Still another aspect of the invention resides in the discovery that a material comprising a polymerized unsaturated polyester, a certain alkaline compound and the silicate fibers of the invention (or a mixture thereof with kaolin) has electrical properties and water resistance substantially better than any of the other products of the invention. Such an alkaline compound is a base formed of a metal of group II of the periodic system, i. e., calcium, barium, strontium, magnesium, zinc, cadium or mercury. Since a metal of group II of the periodic system is not a strongly alkaline metal, a base of such a metal must be a compound of that metal with a weakly acid substance, i. e., the substitution product of a substance with a labile hydrogen atom, having a dissociation constant (for the hydrogen) at least as small as about $3 \times 10^{-7}$, in which substance the labile hydrogen atom is replaced by a metal valence. In other words, in order to be a compound of the metal with a substance having a dissociation constant equal to or less than carbonic acid. Such metal bases include oxides, hydroxides, alcoholates such as methoxides or ethoxides, and carbonates of the metals of group II of the periodic system. It is usually desirable to use a metal base which does not release a volatile material upon neutralization, and therefore, a metal base such as an oxide is preferred in the practice of the invention. Particularly good results are obtained using zinc oxide in the practice of the invention.

The full benefit of the use of the metal base in the practice of the invention is obtained simply by incorporating the metal base in the polyester in the same manner as any filler, i. e., according to the procedures hereinbefore described for incorporating the silicate fibers and kaolin. The metal base may be incorporated in the polyester alone or as a mixture with the fillers hereinbefore mentioned. In fact, although the metal base has several chemical functions, it also functions physically as a part of the filler, i. e., in determining the total amount of filler used the amount of the metal base is added to the amount of the silicate fibers (and kaolin). Accordingly, the proportion of the total filler used in the practice of the invention is within the range hereinbefore described and the preferred range is from about 60 per cent to about 70 per cent of the polyester composition.

The proportion of the metal base used may range from a minimum proportion depending on the chemical function of the metal base (i. e., at least a bare excess over the amount necessary to neutralize the polyester in the composition so that such composition will, in fact, contain some of the metal base) to a maximum proportion depending on the physical function of the (non-fibrous) metal base (i. e., the maximum proportion at which the effect of the silicate fibers is noticeable, which is a metal base to silicate fiber ratio of about 6:1).

In the practice of the invention it is preferable to include kaolin also as a part of the filler and since kaolin is non-fibrous, the ratio of the maximum amount of kaolin plus the metal base to the silicate fibers used is the same as the ratio of the maximum amount of kaolin or metal base to silicate fibers used (i. e., about 6:1). The preferred proportion of the metal base ranges from about 2 per cent to about 20 per cent of the total filler. For example, if a procedure is carried out which is the same as that used to obtain the test results shown in Table 1 except that the filler used is as follows:

Kaolin—37.5 per cent of the composition,
Silicate fibers—22.5 per cent of the composition, and
Zinc oxide—2.5 per cent of the composition;

the water absorption, in cold water for one day, for the test pieces so obtained is about 12 per cent less than that of the test pieces containing the silicate fibers and kaolin, but no zinc oxide (run 1D). On the other hand, if a procedure is carried out which is the same as the foregoing procedure except that the filler used is as follows:

Kaolin—40 per cent of the composition,
Silicate fibers—18 per cent of the composition, and
Zinc oxide—9 per cent of the composition;

the water absorption, in boiling water for one hour, for the test pieces so obtained is about 40 per cent less than that of the test pieces containing the silicate fibers and kaolin, but no zinc oxide (run 1D).

In the practice of the invention a solution comprising one or more polymerizable unsaturated polyesters and one or more polymerizable monomeric compounds is particularly advantageous because the polyester has desirable physical properties and hardens very rapidly, whereas the presence of the monomeric compound causes the polymerized product to be much more water resistant and insoluble. Moreover, the combination in solution of the polyester and the monomeric compound usually polymerizes much more rapidly than either of such substances alone. Such a solution usually contains about 5 per cent to about 35 per cent of the polymerizable monomeric compound and about 95 per cent to about 65 per cent of the polymerizable polyester.

The nature of the change in water resistance which is brought about by a change in the per cent of the monomeric compound in solution with the polyester may be demonstrated by carrying out a procedure which is the same as that used for obtaining the data shown in Table 1 except that different amounts of the polyester and the monomer are used in the solution. Table 2 shows the results of the water resistance tests of articles so prepared, and more specifically describes the compositions from which the articles are molded by specifying the per cent of polyester in the solution (line 2), the per cent of monomer (diallyl phthalate) in the solution (line 3), the percent of the silicate (anthophyllite) fibers in the composition (line 4) and the per cent of kaolin in the composition (line 5). Also in Table 2, the water absorption is given for tests in which test pieces made from the various molding compositions are immersed in hot (boiling) water for one hour (line 6), or in cold water for one day (line 7), two days (line 8) or seven days (line 9).

Table 2

| 1 | Run No. | 1 | 2 | 3 | 4 | 5 |
|---|---|---|---|---|---|---|
| 2 | Per Cent Polyester | 100 | 95 | 80 | 95 | 80 |
| 3 | Per Cent Monomer | 0 | 5 | 20 | 5 | 20 |
| 4 | Per Cent Silicate fibers | 70 | 70 | 70 | 25 | 25 |
| 5 | Per Cent Kaolin | | | | 40 | 40 |
| 6 | Hot Water Absorption (1 hour) | 0.085 | 0.080 | 0.055 | | 0.070 |
| 7 | Cold Water Absorption (1 day) | 0.025 | 0.025 | 0.030 | 0.040 | 0.030 |
| 8 | Cold Water Absorption (2 days) | 0.045 | 0.045 | 0.045 | 0.055 | 0.045 |
| 9 | Cold Water Absorption (7 days) | 0.100 | 0.105 | 0.095 | 0.130 | 0.110 |

From the table it can be seen that the decrease in the water absorption of polyesters containing only the silicate fibers (columns 1–3) is about 35 per cent in the one-hour hot water absorption test when the per cent monomer is increased from 0 per cent (column 1) to 20 per cent (column 3). Also, it can be seen that a corresponding decrease in water absorption is obtained by increasing the per cent monomer in the polyesters containing a kaolin and silicate fiber filler mixture (columns 4 and 5).

A solution similar to that obtained by dissolving the polyester in the foregoing monomeric compounds may be prepared by dissolving the polyester, before use, in a polymerizable substance such as styrene, vinyl acetate, methylmethacrylate or methylacrylate.

Casting and adhesive compositions embodying the invention, of course, may contain as little as about 1 per cent of the silicate fibers, and the maximum per cent of the silicate fibers in such compositions is simply that maximum amount which may be added to the polyester without rendering the composition too stiff. For example, in adhesive compositions the proportion of the silicate fibers to the polyester may range from as low as about 1:100 to as high as about 1:4, the preferred proportions being from about 1:30 to about 1:5.

Since the polymerizable polyester is fusible and plastic at relatively low temperatures, it is possible to adjust the amounts of catalysts and inhibiting agents so that the hardening at such temperatures takes place at a reasonable rate to allow ample opportunity for shaping and molding the composition and to obtain a complete cure in a reasonable length of time.

One of the indications of a complete cure in the polymerized products embodying the invention is the water absorption (i. e., an insufficiently cured product absorbs more water than a completely cured one). The nature of the variation in the water absorption of products embodying the invention with changes in the amount of catalyst used may be demonstrated by carrying out a procedure which is the same as that described in the foregoing demonstrations except that different amounts of catalyst (benzoyl peroxide) are used, and a constant amount of polyester (95 parts), monomer (5 parts of diallyl phthalate) and silicate fibers (70 parts of anthophyllite fibers) are used. Table 3 shows the results of the water resistance tests of articles so prepared, and more specifically describes the compositions from which the articles are molded by specifying the per cent of catalyst (benzoyl peroxide) in the composition (line 2). The water absorption is given for tests in which test pieces made from the various molding compositions are immersed in hot (boiling) water for one hour (line 3), or in cold water for one day (line 4), two days (line 5) or seven days (line 6).

*Table 3*

| 1 | Run No. | 1 | 2 | 3 | 4 |
|---|---|---|---|---|---|
| 2 | Catalyst (per cent) | 1 | 1¼ | 1½ | 2 |
| 3 | Boiling Water Absorption (1 hour) | 0.100 | 0.090 | 0.080 | 0.075 |
| 4 | Cold Water Absorption (1 day) | 0.035 | 0.030 | 0.025 | 0.025 |
| 5 | Cold Water Absorption (2 days) | 0.055 | 0.050 | 0.045 | 0.040 |
| 6 | Cold Water Absorption (7 days) | 0.135 | 0.110 | 0.105 | 0.095 |

From Table 3 it can be seen that the water absorption is decreased by an increase in the amount of catalyst used. The water absorption is not decreased appreciably by the use of more than 1½ per cent catalyst (column 3) and, therefore, it appears that a substantially complete cure is obtained using 1½ per cent catalyst under the foregoing conditions.

The preferred polymerization catalyst for use in the practice of the invention is benzoyl peroxide, but the catalyst used may be any other organic peroxide catalyst, such as succinyl peroxide, t-butyl perbenzoate, di-t-butyl perphthalate, acetyl peroxide, peracetic acid, perbenzoic acid, toluyl peroxide, p-bromo-benzoyl peroxide, anisoyl peroxide, chloroacetyl peroxide, acetyl benzoyl peroxide, diacetyl peroxide or furoyl peroxide, or any organic ozonide catalyst, such as di-isopropylene azonide or diisobutylene ozonide, or a mixture of such catalysts.

The proportion of curing catalyst used in the practice of the invention is simply the proportion that causes the composition to polymerize at the desired rate, and, as the term "catalyst" implies, such proportion is the usual catalytic amount, i. e., ranging from about 0.01 per cent to about 5 per cent of the composition. The preferred proportion of curing catalyst varies with different catalysts, and the amount of any curing catalyst required to produce a given rate of hardening may vary also with variations in the nature of the polymerizable composition. For example, a polyester prepared from maleic anhydride and diethylene glycol, when used in a molding composition of the invention containing about 3 per cent of benzoyl peroxide, cures at approximately the same rate as a similar polyester prepared from fumaric acid and diethylene glycol in which the proportion of benzoyl peroxide is about 0.5 per cent.

If the binder used in the practice of the invention comprises a viscous polymerizable substance and a less viscous polymerizable substance, the polymerization catalyst may be dissolved in the less viscous polymerizable substance before the two substances are mixed. On the other hand, it is often desirable to disperse the polymerization catalyst in the silicate fibers by grinding with the fibers in a ball mill, for example, before the fibers are mixed with the polyester. In some cases the silicate fibers may be mixed with a solution of the the polymerization catalyst in a volatile solvent and dried before the fibers are mixed with the polyester. In the production of a molding or casting composition embodying the invention, plasticizers, lubricants, pigments and other coloring matter may be incorporated if desired.

Good storage stability in a molding compound is essential to its commercial success. One of the most outstanding advantages of the present invention is illustrated by the fact that a material comprising a polymerizable unsaturated polyester and the silicate fibers has storage stability which may be as much as 550 per cent greater than that of a similar material in which the silicate fibers are replaced by chrysotile fibers.

One of the most effective tests for determining the storage stability of the material is a molding life test which is carried out simply by storing samples of the material under standard conditions for various periods of time to determine the length of time for which the material may be stored before it becomes incapable of being molded into satisfactory pieces, i. e., pieces not having an appreciable number of defective spots or points which indicate the presence of "hard centers" or portions of the polyester that had become infusible before molding. These defective spots can be seen readily with the naked eye, and any appreciable number of such spots on a piece makes the piece unsatisfactory for commercial use. The storage stability, as used hereinafter, means the molding life, i. e., the length of time for which the polymerizable material may be stored in a closed container at 90° F. and at 30-50 per cent relative humidity before the material becomes incapable of being molded into satisfactory pieces in a small tumbler mold at ordinary pressures (e. g., 1000-2000 pounds per square inch of projected area). The small tumbler so molded weighs about 13 grams and is 1½ inches high, having a top diameter of 1¾ inches and bottom diameter of $1\frac{3}{16}$ inches.

If the material used in the foregoing storage stability test has a putty-like consistency, it is preferably rolled down into sheets of about ¼ inch or less thickness before it is placed in the storage container. The use of putty-like materials in the instant storage stability test is preferred, since it is possible to determine the storage stability of such materials not only by testing in the tumbler mold (at comparatively low molding pressures) but also by simply feeling the sheeted material. At the storage temperature (90° F.) such sheets are relatively soft, and it is possible to obtain a clear indication of the storage stability simply by feeling the sheeted material in order to determine the size, amount and character of any lumps or "hard centers" which develop during storage.

*Example 1*

A material embodying the invention comprising a polymerizable unsaturated polyester and silicate fibers, for example, anthophyllite fibers, or a mixture thereof with kaolin, may be prepared by carrying out the following procedure:

A polymerizable unsaturated polyester is prepared by the procedure hereinbefore described from a charge consisting of 1.05 mols of monoethylene glycol, 1 mol of maleic anhydride and an amount of hydroquinone equal to 0.04 per cent of the charge. The charge is heated to 220° C. (over a period of two hours) and is held between 220° C. and 226° C. for six more hours. The resulting polyester (95 parts), which has an acid number of about 35, is cooled to 60-70° C. and is mixed thoroughly with diallyl phthalate (5 parts) and a paste of tricresyl phosphate (2 parts) and benzoyl peroxide (2 parts), as a catalyst to form a solution. The polymerizable polyester solution so prepared (40 parts), anthophyllite fibers (60 parts) and, as a lubricant, zinc stearate (2 parts) are then milled for 10-12 minutes on a heated two-roll (differential speed) rubber mill at the lowest temperature at which a homogeneous mass can be obtained (not above about 75° C.). The resulting mass is removed in sheets, allowed to solidify fully while at about 80-90° F. and then granulated in high speed cutter to a maximum particle diameter of about ⅛ inch. The granulated material is compression molded to produce test pieces for determination of water absorption. The composition is fast curing and gives moldings free from gas. The water absorption for a test piece (prepared as hereinbefore described) immersed in hot (boiling) water for one hour is found to be 0.080 gram; and the water absorption of a test piece immersed in cold water is found to be 0.035 gram at the end of one day, 0.050 gram at the end of two days or 0.125 gram at the end of seven days.

A procedure is carried out which is the same as that described in the foregoing paragraph except that chrysotile fibers (53 parts) are used instead of anthophyllite fibers. The water absorption test results for the pieces so obtained are as follows:

| | Grams |
|---|---|
| Hot (boiling) water for one hour | 0.185 |
| Cold water for one day | 0.125 |
| Cold water for two days | 0.185 |
| Cold water for seven days | 0.375 |

A polymerizable unsaturated polyester is prepared by the procedure hereinbefore described from a charge consisting of 1.05 mols of monoethylene glycol, 0.8 mol of maleic anhydride, 0.2 mol of phthalic anhydride and an amount of hydroquinone equal to 0.04 per cent of the charge. The charge is heated to 230° C. (over a period of two hours) and is held at 230-235° C. for five hours. The resulting polyester (70 parts), which has an acid number of about 35, is cooled to 60-80° C. and is mixed thoroughly with diallyl phthalate (25 parts) and a paste of tricresyl phosphate (2 parts) and benzoyl peroxide (2 parts), as a catalyst, to form a solution. A composition consisting of 33 parts of the foregoing polymerizable polyester solution, 20 parts of anthophyllite fibers, 47 parts of kaolin and, as a lubricant, two parts of zinc stearate is then milled for 10-12 minutes in a heated two-roll (differential speed) rubber mill at the lowest temperature at which a homogeneous mass can be obtained (not above about 75° C.). The resulting composition is removed in sheets and cooled while rolling the sheets with cold rolls down to a sheet thickness of about ¼ inch. The sheeted material so obtained is found to have a storage stability, i. e., molding life as hereinbefore described, of 55 days. Some of the sheeted material is compression molded for one minute at 4500 pounds per square inch pressure in a mold heated with steam at 75 pounds per square inch gauge pressure to obtain 4-inch diameter disks ⅛ inch thick, which are free from gas. The disks have a dielectric constant of 5.8 and a power factor of 0.036 at 60 cycles, and a dielectric constant of 4.86 and a power factor of 0.022 at $10^6$ cycles.

A procedure is carried out which is the same as that described in the foregoing paragraph except that chrysotile fibers are used instead of the anthophyllite fibers. The sheeted material has about one-fourth of the molding life of the material containing anthophyllite fibers, and the molded disks have a dielectric constant of 7.5 and a power factor of 0.07 at 60 cycles, and a dielectric constant of 5.14 and a power factor of 0.034 at $10^6$ cycles.

*Example 2*

A material embodying the invention comprising a polymerizable unsaturated polyester and amphibole fibers, for example, tremolite fibers may be prepared by carrying out the following procedure:

A polymerizable unsaturated polyester is prepared by the procedure hereinbefore described from a charge consisting of 1.05 mols of monoethylene glycol, 0.8 mol of maleic anhydride, 0.2 mol of phthalic anhydride and an amount of hydroquinone equal to 0.04 per cent of the charge. The charge is heated to 230° C. (over a period of two hours) and is held at 230-235° C. for five hours more. The resulting polyester (70 parts), which has an acid number of about 35, is cooled to 60-80° C. and is mixed thoroughly with diallyl phthalate (25 parts) and a paste of tricresyl phosphate (2 parts) and benzoyl peroxide (2 parts), as a catalyst, to form a solution. A composition consisting of 33 parts of the foregoing polymerizable polyester solution, 67 parts of tremolite fibers and, as a lubricant, two parts of zinc stearate is then milled for 10-12 minutes in a heated two-roll (differential speed) rubber mill at the lowest temperature at which a homogeneous mass can be obtained (not above about 75° C.). The resulting composition is removed in sheets and reduced to a sheet thickness of about ¼ inch by rolling with cold rolls while the composition cools. The sheeted material so obtained is found to have a storage stability, i. e., molding life as hereinbefore described of 19-26 days. Some of the sheeted material is compression molded for one minute at 4500 pounds per square inch pressure in a mold heated with steam of 75 pounds per square inch gauge pressure to obtain 4-inch diameter disks ⅛ inch thick, which are free from gas. The disks have a dielectric constant of 5.3 and a power factor of 0.045 at 60 cycles, and a dielectric constant of 4.34 and a power factor of 0.017 at $10^6$ cycles. The water absorption for test pieces (prepared as hereinbefore described) is as follows:

| | Grams |
|---|---|
| Hot (boiling) water for one hour | 0.055 |
| Cold water for one day | 0.035 |
| Cold water for two days | 0.050 |
| Cold water for seven days | 0.125 |

A procedure is carried out which is the same as that described in the foregoing paragraph except that chrysotile fibers (50 parts) are used instead of the tremolite fibers. The sheeted material has a molding life of only four days and the molded disks have a dielectric constant of 8.97 and a power factor of 0.10 at 60 cycles, and a dielectric constant of 5.23 and a power factor of 0.069 at $10^6$ cycles. Also, the water absorption test results for pieces so obtained are as follows:

| | Grams |
|---|---|
| Hot (boiling) water for one hour | 0.125 |
| Cold water for one day | 0.100 |
| Cold water for two days | 0.145 |
| Cold water for seven days | 0.275 |

*Example 3*

A material embodying the invention comprising a polymerizable unsaturated polyester and actinolite fibers may be prepared by carrying out a procedure which is the same as that described in Example 2 except that actinolite fibers (70 parts) are used instead of the tremolite fibers. The sheeted material has a molding life of 28-35 days. The water absorption test results for the pieces so obtained are as follows:

| | Grams |
|---|---|
| Hot (boiling) water for one hour | 0.045 |
| Cold water for one day | 0.025 |
| Cold water for two days | 0.035 |
| Cold water for seven days | 0.085 |

The disks so prepared have a dielectric constant of 6.23 and a power factor of 0.071 at 60 cycles, and a dielectric constant of 4.26 and a power factor of 0.020 at $10^6$ cycles.

*Example 4*

A material embodying the invention comprising a polymerizable unsaturated polyester and anthophyllite fibers may be prepared by carrying out a procedure which is the same as that described in Example 2 except that anthophyllite fibers (65 parts) are used instead of tremolite fibers. (The anthophyllite fibers used in this example are obtained from Powhatan Mining Co., and the anthophyllite fibers used in Example 1 are obtained from Johns-Manville.) The sheeted material has a molding life of 17 days. The water absorption test results for the pieces so obtained are as follows:

| | Grams |
|---|---|
| Hot (boiling) water for one hour | 0.055 |
| Cold water for one day | 0.020 |
| Cold water for two days | 0.030 |
| Cold water for seven days | 0.090 |

The molded disks have a dielectric constant of 4.77 and a power factor of 0.023 at 60 cycles, and a dielectric constant of 4.37 and a power factor of 0.019 at $10^6$ cycles.

*Example 5*

A material embodying the invention comprising a polymerizable unsaturated polyester and a mixture of pyroxene and amphibole fibers may be prepared by carrying out a procedure that is the same as that described in Example 2 except that a pyroxene-amphibole fiber mixture is used instead of the tremolite fibers. The pyroxene-amphibole fiber mixture consists of 47 parts of wollastonite and 20 parts of anthophyllite fibers (the anthophyllite fibers being obtained from Industrial Minerals Co.). The water absorption test results for the pieces so obtained are as follows:

| | |
|---|---|
| Hot boiling water for one hour | 0.040 |
| Cold water for seven days | 0.074 |

*Example 6*

A material embodying the invention comprising a polymerizable unsaturated polyester and pyroxene fibers may be prepared by carrying out a procedure that is the same as that described in Example 2 except that wollastonite fibers (75 parts) are used instead of tremolite fibers, and the amount of the polymerizable polyester solution used is 25 parts instead of 33 parts. The water absorption test results for the pieces so obtained are as follows:

| | |
|---|---|
| Hot boiling water for one hour | 0.030 |
| Cold water for seven days | 0.065 |

The molded disks have a dielectric contant of 5.65 and a power factor of 0.002 at 60 cycles, and a dielectric constant of 4.8 and a power factor of 0.013 at $10^6$ cycles.

*Example 7*

A material embodying the invention comprising a polymerizable unsaturated polyester and diopside fibers may be prepared by carrying out a procedure that is the same as that described in Example 2 except that diopside fibers (81 parts) are used instead of the tremolite fibers and the amount of the polymerizable polyester solution used in 19 parts instead of 33 parts. The water absorption test result for the pieces so obtained when subjected to hot boiling water for one hour is 0.035.

*Example 8*

A material embodying the invention comprising a polymerizable unsaturated polyester and a mixture of pyroxene fibers with kaolin may be prepared by carrying out a procedure that is the same as that described in Example 2 except that a kaolin-pyroxene mixture is used instead of the tremolite fibers. The kaolin-pyroxene fiber mixture consists of 20 parts of wollastonite fibers and 47 parts of kaolin. The water absorption test results for the pieces so obtained are as follows:

| | |
|---|---|
| Hot boiling water for one hour | 0.051 |
| Cold water for seven days | 0.083 |

This is a continuation-in-part of application Serial No. 39,184, filed July 16, 1948, now abandoned.

Having described the invention, I claim:

1. A composition comprising (a) a polymerizable unsaturated polyhydric alcohol-polycarboxylic acid polyester and (b) fibers of crystalline fibrous silicates consisting essentially of anhydrous silicates of divalent metals; the proportion of (a) to (b) ranging from 100:1 to 1:3.

2. The product of the polymerization of a material claimed in claim 1.

3. A molding compound comprising (a), as a binder, a polymerizable unsaturated polyhydric alcohol-polycarboxylic acid polyester and (b), as a filler therefor, fibers of crystalline fibrous silicates consisting essentially of anhydrous silicates of divalent metals.

4. A molding compound comprising (a), as a binder, a polymerizable unsaturated polyhydric alcohol-polycarboxylic acid polyester and (b), as a filler therefor, fibers of crystalline fibrous silicates consisting essentially of anhydrous silicates of divalent metals and kaolin, the weight ratio of kaolin to the fibers ranging from 1:100 to 6:1.

5. A molding compound comprising (a), as a binder, a polymerizable unsaturated polyhydric alcohol-polycarboxylic acid polyester and (b), as a filler therefor, fibers of crystalline fibrous silicates consisting essentially of anhydrous silicates of divalent metals, kaolin and a base of a metal of group II of the periodic system, the weight ratio of the total of kaolin plus the base to the fibers ranging from 1:100 to 6:1, and the amount of the base ranging from 2 to 20 per cent of the total weight of the filler, the base being capable of neutralizing the polyester.

6. A molding compound comprising (a), as a binder, a polymerizable unsaturated polyhydric alcohol-polycarboxylic acid polyester and (b), as a filler therefor, fibers of crystalline fibrous silicates consisting essentially of anhydrous silicates of divalent metals and a base of a metal of group II of the periodic system, the amount of the base ranging from 2 to 20 per cent of the total weight of the filler and the base being capable of neutralizing the polyester.

7. A molding compound comprising (a), as a binder, a polymerizable unsaturated polyhydric alcohol-polycarboxylic acid polyester and (b), as a filler therefor, pyrobole fibers consisting essentially of silicates of divalent metals, and kaolin, the weight ratio of kaolin to pyrobole fibers ranging from 1:100 to 6:1.

8. A molding compound comprising (a), as a binder, a polymerizable unsaturated polyhydric alcohol-polycarboxylic acid polyester and (b), as a filler therefor, pyrobole fibers consisting essentially of silicates of divalent metals, and a base of a metal of group II of the periodic system, the amount of said base ranging from 2 to 20 per cent of the total weight of the filler and said base being capable of neutralizing the polyester.

9. A molding compound comprising (a), as a binder, a polymerizable unsaturated polyhydric alcohol-polycarboxylic acid polyester and (b), as a filler therefor, wollastonite fibers.

10. A molding compound comprising (a), as a binder, a polymerizable unsaturated polyhydric alcohol-polycarboxylic acid polyester and (b), as a filler therefor, anthophyllite fibers and kaolin, the weight ratio of kaolin to the fibers ranging from 1:100 to 6:1.

11. A molding compound comprising (a), as a binder, a polymerizable unsaturated polyhydric alcohol-polycarboxylic acid polyester and (b), as a filler therefor, anthophyllite fibers and a base of a metal of group II of the periodic system, the amount of said base ranging from 2 to 20 per cent of the total weight of the filler and said base being capable of neutralizing the polyester.

12. A molding compound comprising (a), as a binder, a polymerizable unsaturated polyhydric alcohol-polycarboxylic acid polyester and (b), as a filler therefor, diopside fibers.

13. A molding compound comprising (a), as a binder, a polymerizable unsaturated polyhydric alcohol-polycarboxylic acid polyester and (b), as a filler therefor, silicate fibers and kaolin, the weight ratio of kaolin to the fibers ranging from 1:100 to 6:1, said fibers having the crystalline mineral structure of a divalent metal silicate wherein isomorphous substitution has not taken place to the extent that the silicate contains more than 0.2 mol of $H_2O$ per mol of $SiO_2$, more than 0.1 mol of $X_2O$ per mol of $SiO_2$, or more than 0.1 mol of $Y_2O_3$ per mol of $SiO_2$, wherein X represents a monovalent metal and Y represents a trivalent metal.

14. A molding compound comprising (a), as a binder, a polymerizable unsaturated polyhydric alcohol-polycarboxylic acid polyester and (b), as a filler therefor, crystalline fibers and kaolin, the weight ratio of kaolin to the fibers ranging from 1:00 to 6:1, the empirical formula for the chemical composition of such fibers being $$xX_2O.mMO.yY_2O_3.SiO_2.zH_2O$$

$x = 0$ to $0.1$
$y = 0$ to $0.1$
$z = 0$ to $0.2$
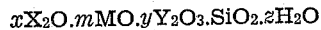
M is of the class consisting of Ca, Mg, Fe, Mn and mixtures thereof
X is of the class consisting of Na, K and mixtures thereof, and
Y is of the class consisting of Al, Fe and mixtures thereof.

15. A material which has improved storage stability and which upon polymerization has improved water resistance and electrical properties, comprising amphibole fibers consisting essentially of silicates of divalent metals and a polymerizable unsaturated polyhydric alcohol-polycarboxylic acid polyester, the proportions of said fibers to said polyester ranging from 1:100 to 3:1.

16. A molding compound of improved stability, that produces molded articles of improved water resistance and electrical properties, comprising (1), as a binder, a polymerizable unsaturated polyhydric alcohol-polycarboxylic acid polyester and, (2) as a filler therefor, amphibole fibers consisting essentially of silicates of divalent metals.

17. A molding compound of improved stability, that produces molded articles of improved water resistance and electrical properties, comprising (1), as a binder, a polymerizable unsaturated polyhydric alcohol-polycarboxylic acid polyester and, (2), as a filler therefor, amphibole fibers consisting essentially of silicates of divalent metals, and kaolin, the weight ratio of kaolin to amphibole fibers ranging from 1:100 to 6:1.

18. A molding compound of improved stability, that produces molded articles of improved water resistance and electrical properties, comprising (1), as a binder, a polymerizable unsaturated polyhydric alcohol-polycarboxylic acid polyester, and, (2), as a filler, a zinc base, and amphibole fibers consisting essentially of silicates of divalent metals, the amount of the zinc base ranging from 2 to 20 per cent of the total weight of the filler, said zinc base being capable of neutralizing the polyester.

19. A molding compound of improved stability, that produces molded articles of improved water resistance and electrical properties, comprising (1), as a binder, a polymerizable unsaturated polyhydric alcohol-polycarboxylic acid polyester, and, (2) as a filler, a zinc base, amphibole fibers consisting essentially of silicates of divalent metals, and kaolin, the weight ratio of the total of kaolin plus zinc base to amphibole fibers ranging from 1:100 to 6:1, and the amount of the zinc base ranging from 2 to 20 per cent of the total weight of the filler, said zinc base being capable of neutralizing the polyester.

20. A molding compound of improved stability, that produces molded articles of improved water resistance and electrical properties, comprising (1), as a binder, a polymerizable unsaturated polyhydric alcohol-polycarboxylic acid polyester and (2), as a filler therefor, anthophyllite fibers.

21. A molding compound of improved stability, that produces molded articles of improved water resistance and electrical properties, comprising (1), as a binder, a polymerizable unsaturated polyhydric alcohol-polycarboxylic acid polyester and (2), as a filler therefor, tremolite fibers.

22. A molding compound of improved stability, that produces molded articles of improved water resistance and electrical properties, comprising (1), as a binder, a polymerizable unsaturated polyhydric alcohol-polycarboxylic acid polyester and (2), as a filler therefor, actinolite fibers.

23. A molding compound comprising (1), as a binder, a polymerizable unsaturated polyhydric alcohol-polycarboxylic acid polyester and (2), as a filler, kaolin and pyrobole fibers of the class consisting of wollastonite fibers, diopside fibers, tremolite fibers and actinolite fibers, the weight ratio of kaolin to pyrobole fibers ranging from 1:100 to 6:1.

24. A molding compound comprising (1), as a binder, a polymerizable unsaturated polyhydric alcohol-polycarboxylic acid polyester and (2), as a filler, a base of a metal of group II of the periodic system and pyrobole fibers of the class consisting of wollastonite fibers, diopside fibers, tremolite fibers and actinolite fibers, the amount of the base ranging from 2 to 20 per cent of the total weight of the filler, said base being capable of neutralizing the polyester.

WELCOME I. WEAVER.

REFERENCES CITED

The following references are of record in the file of this patent:

UNITED STATES PATENTS

| Number | Name | Date |
|---|---|---|
| 1,975,750 | Safford | Oct. 2, 1934 |
| 2,407,520 | Smolak | Sept. 10, 1946 |
| 2,510,503 | Kropa | June 6, 1950 |

OTHER REFERENCES

The Vanderbilt Rubber Handbook (1942), page 241.